United States Patent [19]

Fischer et al.

[11] 4,439,887

[45] Apr. 3, 1984

[54] WIPER ARM WITH WASHER NOZZLE FOR MOTOR VEHICLE WINDOWS

[75] Inventors: Peter Fischer, Langenfeld; Axel Rauthmann, Pulheim; Erwin Pietryk, Cologne, all of Fed. Rep. of Germany

[73] Assignee: Ford Motor Company, Dearborn, Mich.

[21] Appl. No.: 339,523

[22] Filed: Jan. 15, 1982

[30] Foreign Application Priority Data

Jan. 27, 1981 [DE] Fed. Rep. of Germany ....... 3102538

[51] Int. Cl.³ .................................................. B60S 1/46
[52] U.S. Cl. .................................................. 15/250.04
[58] Field of Search .................... 15/250.01–250.04; 239/284 R

[56] References Cited

U.S. PATENT DOCUMENTS

| 2,289,650 | 7/1942 | Horton | 239/284 |
| 2,609,561 | 9/1952 | Wernig | 15/250.04 |
| 2,622,929 | 12/1952 | Neufeld | 15/250.01 X |

FOREIGN PATENT DOCUMENTS

| 2537470 | 4/1976 | Fed. Rep. of Germany ... 15/250.04 |
| 53-16228 | 2/1978 | Japan ................................. 15/250.04 |
| 1201291 | 8/1970 | United Kingdom ............. 15/250.04 |

Primary Examiner—Peter Feldman
Attorney, Agent, or Firm—Daniel M. Stock; Clifford L. Sadler

[57] ABSTRACT

In the case of a windscreen wiper arm for vehicle windows with a fastening piece connected torsionally rigid to a hollow wiper shaft extending through a wiper bearing and a wiper arm connected with this around a swivel axle running across the wiper shaft, which has in a flexible plastic part covering the fitting a washer nozzle connected to the hollow wiper shaft, the flexible plastic part is made as a known cover (19) in register with the swivel axle (15) of the wiper arm (16), which is also in register via an internal ball pan (21) with the ball - nipple outer end (22) of the hollow wiper shaft (6) in order to ensure a desired adjustment of the washer nozzle (25) disposed in the flexible plastic part.

4 Claims, 3 Drawing Figures

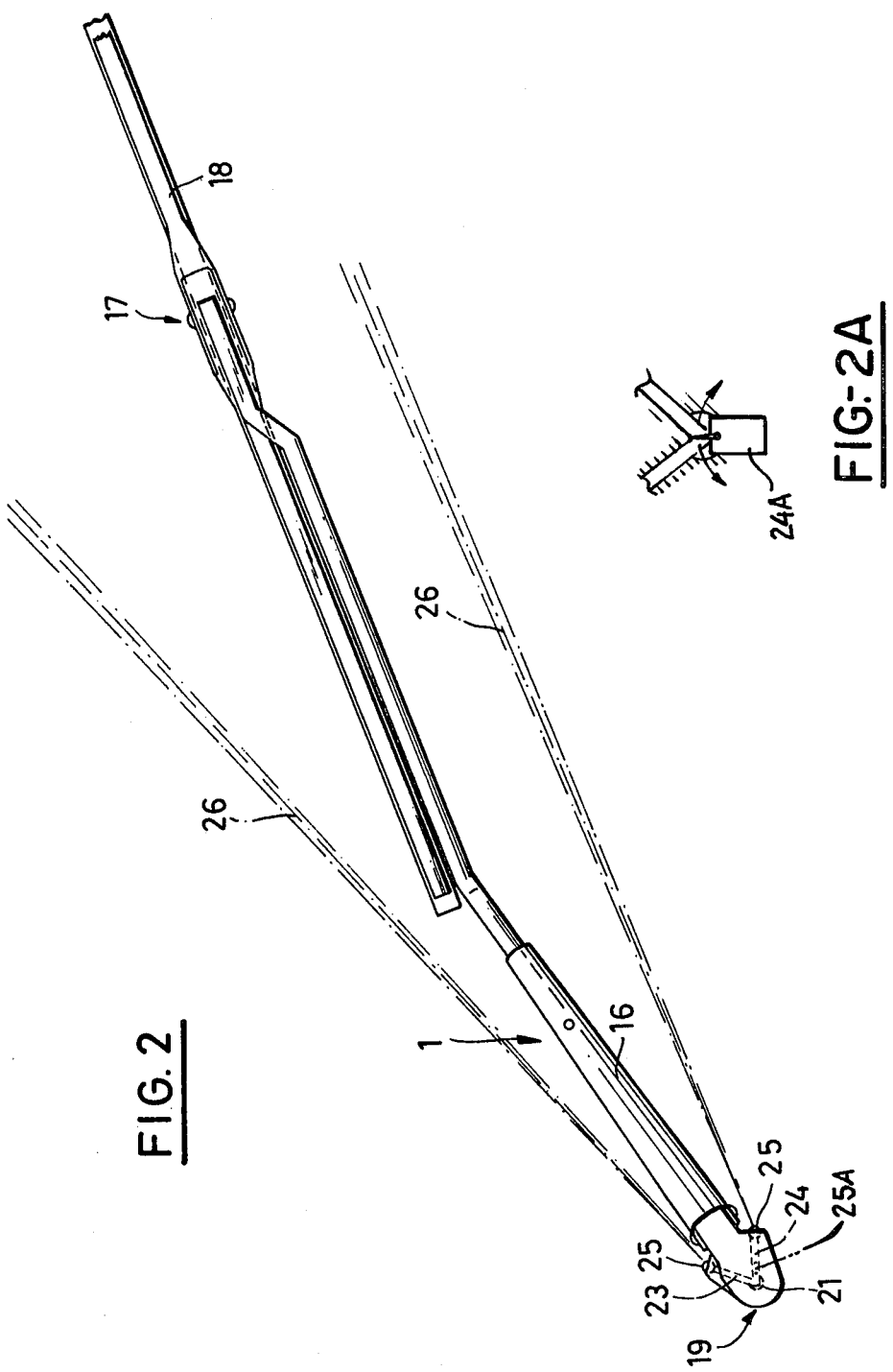

WIPER ARM WITH WASHER NOZZLE FOR MOTOR VEHICLE WINDOWS

The invention is based on a windscreen wiper arm with washer nozzle for vehicle windows.

A windscreen wiper arm, of approximately this type is already known from British Patent Specification GB-PS No. 1 201 291. In the case of this windscreen wiper arm the fastening piece connected torsionally rigid with the hollow wiper shaft extending through a wiper bearing is specially constructed and has corresponding channels and a tapped hole for an adjustable nozzle.

The known arrangement thus has the disadvantage that the fastening piece of the windscreen wiper arm in comparison with a conventional type has to be completely modified and subjected to correspondingly expensive processing.

A further windscreen wiper arm of this type is already known from German laid open Patent DE-OS No. 25 37 470. In the case of this windscreen wiper arm the fastening piece connected torsionally rigid with the hollow wiper shaft can be made in conventional manner, whilst a flexible plastic part covering the fastening has a washer nozzle connected to the hollow wiper shaft.

This known arrangement has the disadvantage that since the flexible plastic part is to be in register with the retaining nut the adjustment of the washer nozzle is not determined from the outset but can only be done by repeated taking off and putting on. In addition the connection between the fastening piece and the wiper arm connected to this around a swivel axle running across the wiper shaft is not covered in the desired manner.

It is the function of the invention to improve a windscreen wiper arm with washer nozzle for vehicle windows in such a way that by means of a single component the desired covering of the fastening of the fastening piece and the connection between the fastening piece and the wiper arm is ensured and at the same time as this a sealed and adjusted disposal of the washer nozzle is achieved.

Since the flexible plastic part is in the form of a known cover in register with the swivel axle of the wiper arm, which also is in register via an internal ball pan with the ball nipple end of the hollow wiper shaft, this ensures simply a sealed connection of the channels formed in the cover with simultaneous adjustment to the vehicle window.

The channels connected to the hollow wiper shaft can here be provided in known fashion with spherical, adjustable nozzles.

The channels connected to the hollow wiper shaft can here extend to both sides of the wiper arm and have on one side only an actually drilled-through nozzle, whilst on the other side is inserted a so-called blind nozzle. The cover can be designed both for a one-sided and also a two-sided nozzle arrangement.

The channels connected to the hollow wiper shaft can extend from a control point (not shown) to both sides of the wiper arm and by means of a control element at this point be controlled dependent on movement in such a way that alternatingly only the washer nozzle preceding the wiper blade is loaded with fluid.

The invention is explained in greater detail with the aid of an exemplified embodiment shown in the accompanying drawings.

Shown in:

FIG. 1 is a vertical section along the axis of the wiper shaft of a windscreen wiper arm arrangement according to the invention and FIG. 2 is a top view of a windscreen wiper arm according to FIG. 1.

FIG. 2A is a diagrammatic cross-sectional view of a control element according to the present invention.

Figure 1:
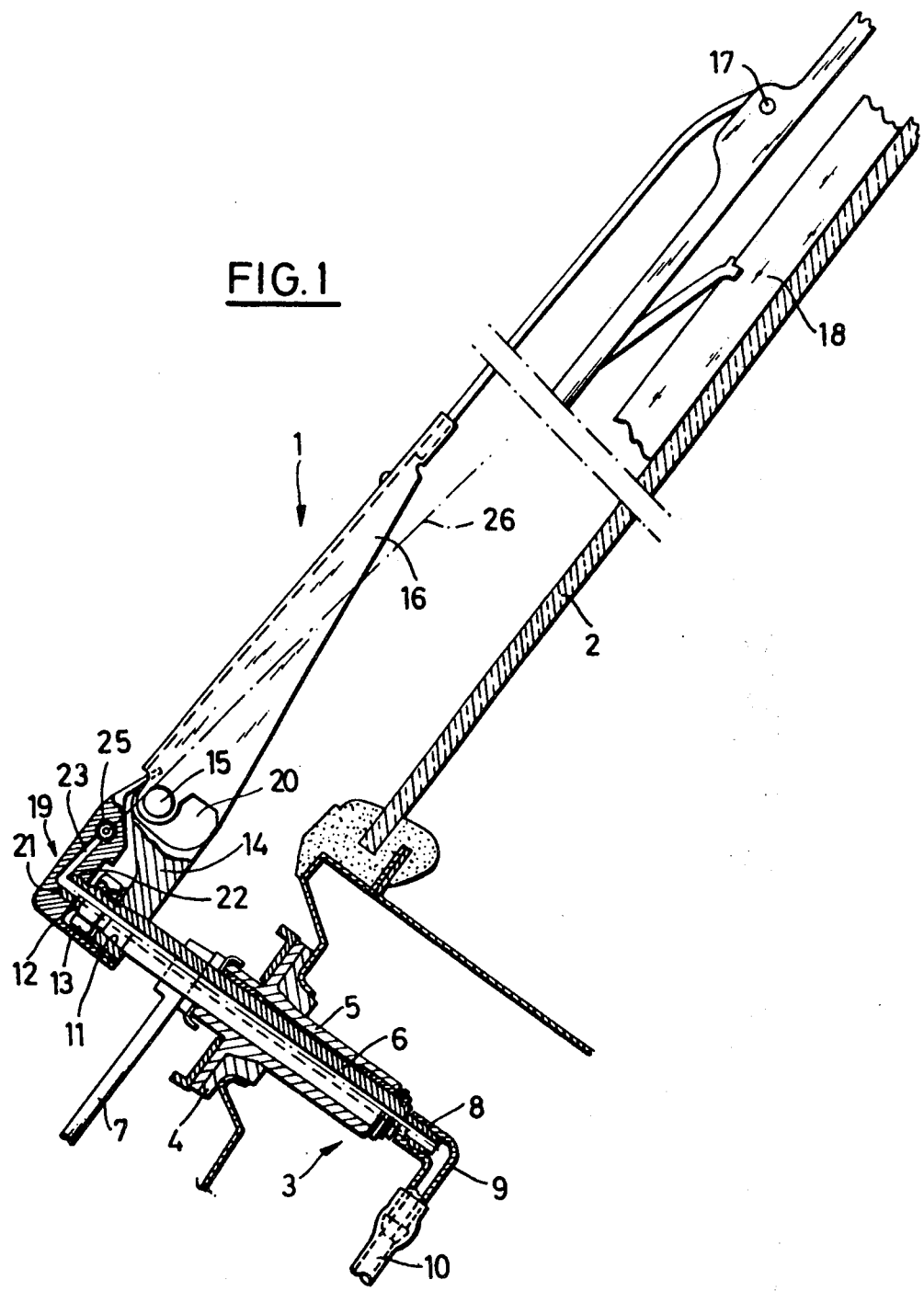

In the figures is shown a windscreen wiper arm 1 with a washer nozzle for vehicle windows in its fitted position.

The windscreen wiper arm 1 strokes over a vehicle window 2 because of the windscreen wiper shaft arrangement 3 which operates it.

The windscreen wiper arm arrangement 3 consists essentially of a wiper bearing 5 supported by an elastic shaft insert 4 in an opening in the bodywork plate in which the hollow wiper shaft 6 is pivoted. The wiper shaft 6 is here connected via a wiper rod 7 with a windscreen wiper motor (not shown).

The hollow wiper shaft 6 is provided at its inner end with a connector 8 via which it is connected via an elbow 9 and a hose line 10 with a windscreen washer pump (not shown).

The hollow wiper shaft 6 has at its outer end a conical fixing part 11 and a tap section 12 to receive a retaining nut 13.

The windscreen wiper arm 1 consists essentially of a fitting 14 to which a wiper arm 16 is fixed around a swivel axle 15 running across the wiper shaft 6 which is pressed by a spring arrangement (not shown) into contact with the windscreen 2. The wiper arm 16 is here connected via a conventional detachable connection 17 to swivel with a conventional wiper blade arrangement 18.

The windscreen wiper arm 1 is connected torsionally rigid at the hollow wiper shaft 6 via its fitting 14 on the fixing part 11 by tightening the retaining nut 13 on the tap section 12.

This fixing arrangement is covered in conventional fashion by means of a cover 19 made of flexible plastic of which the side walls 20 are in register with the swivel axle 15 of the wiper arm 16.

According to the invention this flexible plastic cover 19 is made with a ball pan 21 via which it is tightly in register with a ball nipple at the outer end of the wiper shaft 6. The cover 19 also has channels 23 and/or 24 in the end areas of which are inserted spherical, adjustable nozzles 25.

As can be seen from the fluid jets 26 indicated in FIGS. 1 and 2 in dash dot lines washer fluid can be applied both before and after the corresponding windscreen wiper blade 18, whereby alternatively, however the application of washer fluid can be provided only on one side of the windscreen wiper blade, if on one side a channel 24 is omitted or a blind nozzle as a plug inserted as in the position indicated at 25A or if in a control point a control element such as that shown diagrammatically at 24A in FIG. 2A is disposed between the channels 23 and 24 which in known fashion controls the loading of the two channels 23 and 24 depending on the movement so that only the washer nozzle preceding the windscreen wiper blade is loaded with washer fluid.

Since the flexible plastic cover 19 is in register on the one hand with the hollow wiper shaft 6 and on the other hand with the swivel axle 15 a basic adjustment of channels 23 and 24 is ensured, whereupon the known nozzles can be adjusted by means of the usual fine setting device.

We claim:

1. Windscreen wiper arm with washer nozzle for vehicle windows with a fastening piece connected torsionally rigid to a hollow wiper shaft extending outwardly with respect to the window through a wiper bearing and a wiper arm connected with the wiper shaft around a swivelling axle running transverse to the wiper shaft and whereby, in a flexible plastic part covering the fastening piece, there is disposed a washer nozzle connected to the hollow wiper shaft, characterized in that the flexible plastic part is in the form of a cover (19) receiving the swivelling axle (15) of the wiper arm (16) and the flexible plastic part includes an internal ball cup (21) for receiving the outer end of the hollow wiper shaft (6) in close fit relationship the outer end being formed as a ball nipple (22).

2. Windscreen wiper arm as claimed in claim 1 characterised in that spherical, adjustable nozzles (25) are inserted in first and second channels (23 and 24) formed in the flexible plastic part in fluid communication with the hollow wiper shaft (6).

3. Windscreen wiper arm as claimed in claim 2, characterised in that in the channels (23 and 24) in fluid communication with the hollow wiper shaft (6) a drilled-through nozzle (25) is inserted only on one side, while on the other side a blind nozzle is inserted.

4. Windscreen wiper arm as claimed in claim 2, characterised in that between the channels (23 and 24) connected to the hollow wiper shaft (6) is disposed means for controlling the direction of fluid to either of the channels dependent on movement of the wiper arm in such a way that only the washer nozzle preceding the wiper blade is in fluid communication with the hollow shaft.

* * * * *